US012601408B2

(12) United States Patent
Zhao et al.

(10) Patent No.: US 12,601,408 B2
(45) Date of Patent: Apr. 14, 2026

(54) CONTROL VALVE

(71) Applicant: Siemens Schweiz AG, Zürich (CH)

(72) Inventors: Fang Zhao, Beijing (CN); Fu Lai Zhong, Tianjin (CN); Ning Zhan, Beijing (CN)

(73) Assignee: SIEMENS SCHWEIZ AG, Zurich (CH)

( * ) Notice: Subject to any disclaimer, the term of this patent is extended or adjusted under 35 U.S.C. 154(b) by 953 days.

(21) Appl. No.: 17/790,804

(22) PCT Filed: Jan. 2, 2020

(86) PCT No.: PCT/CN2020/070018
§ 371 (c)(1),
(2) Date: Dec. 2, 2022

(87) PCT Pub. No.: WO2021/134743
PCT Pub. Date: Jul. 8, 2021

(65) Prior Publication Data
US 2025/0341256 A1      Nov. 6, 2025

(51) Int. Cl.
*F16K 3/32*          (2006.01)
*F16K 3/24*          (2006.01)
(Continued)

(52) U.S. Cl.
CPC ................ *F16K 3/32* (2013.01); *F16K 3/246* (2013.01); *F16K 35/022* (2013.01); (Continued)

(58) Field of Classification Search
CPC ...... F16K 35/022; F16K 37/0016; F16K 3/32; F16K 3/246; F24D 19/1018; F24D 19/1015
See application file for complete search history.

(56) References Cited

U.S. PATENT DOCUMENTS

| 10,253,888 B2* | 4/2019 | Rosa Brusin | ........... F16K 1/526 |
| 10,935,272 B2 | 3/2021 | Wang | ...................... F25B 41/04 |

(Continued)

FOREIGN PATENT DOCUMENTS

| CN | 102155579 A1 | 8/2011 | ............. F16K 17/20 |
| CN | 102261501 | 11/2011 | ............. F16K 17/20 |

(Continued)

OTHER PUBLICATIONS

Search Report for International Application No. PCT/CN2020/070018, 10 pages, Sep. 27, 2020.

(Continued)

*Primary Examiner* — Marina A Tietjen
(74) *Attorney, Agent, or Firm* — Slayden Grubert Beard PLLC

(57)          ABSTRACT

Various embodiments include a control valve comprising: a valve body having a fluid inlet, a fluid outlet, and an inner cavity between them; a flow rate presetting assembly; and an indicator. The rate setting assembly includes: an adjusting rod having a first end projecting from the body and a second end extending into the cavity, and rotating around an axis; a control component disposed at a bottom side of the body and connected to the first end to rotate the adjusting rod; and an adjusting component disposed in the inner cavity connected to the adjusting rod, rotating between a first position and a second position under the action of the adjusting rod to set a maximum degree of opening of the control valve. The deviation of the indicating part relative to a reference position indicates a maximum flow rate corresponding to a position of the adjusting component.

10 Claims, 6 Drawing Sheets

(51) Int. Cl.
    *F16K 35/02*         (2006.01)
    *F16K 37/00*         (2006.01)
    *F24D 19/10*         (2006.01)

(52) U.S. Cl.
    CPC ...... *F16K 37/0016* (2013.01); *F24D 19/1015*
            (2013.01); *F24D 19/1018* (2013.01)

(56)         References Cited

U.S. PATENT DOCUMENTS

| | | | |
|---|---|---|---|
| 2010/0170581 A1 | 7/2010 | Loeffler | 137/455 |
| 2015/0198258 A1 | 7/2015 | Ibsen et al. | 137/556.6 |
| 2016/0246306 A1 | 8/2016 | Giubertoni | 137/486 |

FOREIGN PATENT DOCUMENTS

| | | | |
|---|---|---|---|
| CN | 104747747 | 7/2015 | F16K 5/06 |
| CN | 205260990 | 5/2016 | F16K 31/64 |
| CN | 207975295 U | 10/2018 | F16K 17/30 |
| CN | 109944955 | 6/2019 | F16K 1/36 |
| EP | 0783642 B9 | 1/2006 | F24D 19/10 |
| GB | 2 483 507 | 3/2012 | F21V 5/04 |
| KR | 100792191 B1 * | 1/2008 | F16K 41/04 |
| WO | 2006 136158 | 12/2006 | F16K 5/10 |
| WO | WO-2020002337 A1 * | 1/2020 | F16K 13/00 |

OTHER PUBLICATIONS

Chinese Office Action, Application No. 202080073533.6, 8 pages, Oct. 11, 2023.

* cited by examiner

CONTROL VALVE

TECHNICAL FIELD

The present disclosure relates to valves. Various embodiments of the teachings herein may include control valves.

BACKGROUND

Control valves are commonly used in the HVAC field, being widely used in civil heating systems and industrial scenarios in which fluid flow rates need to be controlled. Control valves include on/off valves with the sole function of opening/closing, regulating valves capable of regulating flow rate in response to external control, and pressure independent balancing valves, etc. These control valves may have a flow rate presetting function, i.e. presetting the maximum flow rate that can flow through the control valve.

Existing control mechanisms for flow rate presetting are generally disposed at the top of the valve body, along with actuators generally disposed at the top of the control valve. For reasons of space, etc., the size of the preset flow rate cannot be communicated to the user in a visually direct way. When presetting the flow rate of such a control valve (especially a small-bore control valve), it is necessary to first remove the actuator from the top of the control valve in order to see the dial indicating the preset flow rate value, and after adjusting the flow rate presetting mechanism, the actuator is re-fitted to the control valve.

In addition, existing flow rate presetting mechanisms generally use the same valve rod as a valve plug assembly used for flow rate regulation. During operation, the flow rate presetting mechanism will drive the valve rod to move together with it. In some applications, flow rate presetting is achieved by controlling the stroke of the valve rod in the axial direction; such operation is quite cumbersome, and due to the need to limit the axial stroke of the valve rod, other functions of the valve will be affected.

SUMMARY

Teachings of the present disclosure include control valves which facilitate observation and flow rate presetting by an operator, wherein the abovementioned operations can be completed without the need for removal and re-fitting of an actuator connected to the top of a valve body. For example, some embodiments include a control valve (10), characterized by comprising: a valve body (1), having a fluid inlet (12), a fluid outlet (14), and an inner cavity (16) in fluid communication with the fluid inlet (12) and the fluid outlet (14); a flow rate presetting assembly (8), comprising: an adjusting rod (81), having one end projecting from the bottom of the valve body (1) and another end extending into the inner cavity (16), the adjusting rod (81) being rotatable around an axis (Y) of the adjusting rod; a control component (83), disposed at a bottom side of the valve body (1) in such a way as to be rotatable around the axis (Y), and connected in a shape-fitted manner to an end (811) of the adjusting rod (81) that projects from the valve body (1), in order to drive the adjusting rod (81) to rotate; an adjusting component (82), disposed in the inner cavity (16) and fixedly connected to the adjusting rod, the adjusting component (82) being rotatable between a first position and a second position under the driving action of the adjusting rod (81), in order to set a maximum degree of opening of the control valve (10); wherein an indicating part (831) is provided on a surface of the control component (83) that faces the valve body (1)

and/or on a surface of the control component that faces away from the valve body (1), and deviation of the indicating part relative to a reference position can indicate a maximum flow rate corresponding to a position of the adjusting component (82), the reference position being fixed relative to the valve body.

In some embodiments, a radial dimension of the control component (83) is greater than a radial dimension of the valve body (1), and the control component is preferably a hand wheel.

In some embodiments, the indicating part (831) comprises a dial disposed at an edge position of the control component (83); the reference position is a pointer part (61), which is fixed relative to the valve body (1) and extends to the outside of the indicating part (831) of the control component (83).

In some embodiments, the valve further comprises: a regulating valve assembly (2), disposed in the inner cavity (16) and able to adjust a degree of opening of the control valve (10) under the driving action of a valve rod (21); wherein the adjusting rod (81) is independent of the valve rod (21).

In some embodiments, the control valve (10) further comprises a locking member (7) disposed at the control component (83), the locking member switching operably between a free position allowing rotation of the control component (83) relative to the valve body (1) and a locked position preventing rotation of the control component (83) relative to the valve body (1).

In some embodiments, the control valve further comprises a removable valve cap (6) disposed at the bottom of the valve body (6), the valve cap having a through-hole for the adjusting rod (81) to project through, and the valve cap also having multiple tooth parts (62) which are disposed on a surface facing the control component (83) and arranged around the axis (Y); the locking member (7) has a locking part (731), configured to project toward the valve cap (6) from the control component (83), wherein, when the locking member (7) is at the locked position, the locking part (731) interferes with the tooth part (62), thereby preventing rotation of the control component (83) relative to the valve body (1); and when the locking member (7) is at the free position, the interference between the locking part (731) and the tooth part (62) is released.

In some embodiments, the free position and the locked position of the locking member (7) are distributed in a radial direction perpendicular to the axis (Y); the locking part (731) is configured to be adapted to be clamped between two adjacent said tooth parts (62) at the locked position.

In some embodiments, a penetrating slide groove (834) extending in a radial direction is provided on the control component (83), the locking member (7) being adapted to pass through the slide groove (834) and slidable between the locked position and the position in the length direction of the slide groove; the locking member (7) further comprises an operating part (71), which projects from the control component (83) in a direction away from the valve body (1); wherein the locking member comprises an anti-detachment part (73) located at a side of the slide groove that is close to the valve cap, the locking part is disposed on a surface of the anti-detachment part that faces the valve cap, and the slide groove has a transverse dimension smaller than that of the anti-detachment part (73).

In some embodiments, a protrusion (8341) located between the locked position and the free position is further provided on an inner wall of the slide groove (831), the protrusion being configured to be able to keep the locking member (7) at the current locked position or the current free position in the absence of external manipulation; and a part (72) of the locking member (7) that passes through the slide groove (834) preferably has a rounded edge.

In some embodiments, the valve further comprises an elastic member, which has one end fixedly connected to the locking member (7) and another end fixedly connected to the control component (92), the elastic member being arranged such that the locking member (7) is subjected to a biasing force toward the locked position.

In some embodiments, the control component (83) can be engaged with the valve cap (6), and has a rotatable position and an engaged position in the direction of the axis (Y), wherein, in the engaged position, the control component (83) is engaged with the valve cap (6) such that the control component (83) is fixed relative to the valve cap; and in the rotatable position, the engagement between the control component (83) and the valve cap (6) is released, so that the control component (83) can rotate relative to the valve cap (6) around the axis (Y).

In some embodiments, a first engagement part (64) is provided on an outer edge of the valve cap (6); a second engagement part (836) is provided on an inner edge of the control component (83) at a side facing the valve cap (6), the second engagement part being adapted to hook onto the first engagement part (64), and capable of reaching the engaged position and engaging tightly with the first engagement part (64) under the action of gravity; wherein, when the control component (83) is subjected to a force in the direction of the valve cap (6) and thus reaches the rotatable position, the engagement between the first engagement part and the second engagement part is released.

In some embodiments, the first engagement part (64) is a component that is independent of the valve cap (6), and can be fitted around the bottom of the valve cap (6).

In some embodiments, the indicating part (831) is removably mounted on the control component (83).

BRIEF DESCRIPTION OF THE DRAWINGS

The accompanying drawings below are merely intended to illustrate and explain the present disclosure schematically, without limiting the scope thereof, wherein.

Figure 1:
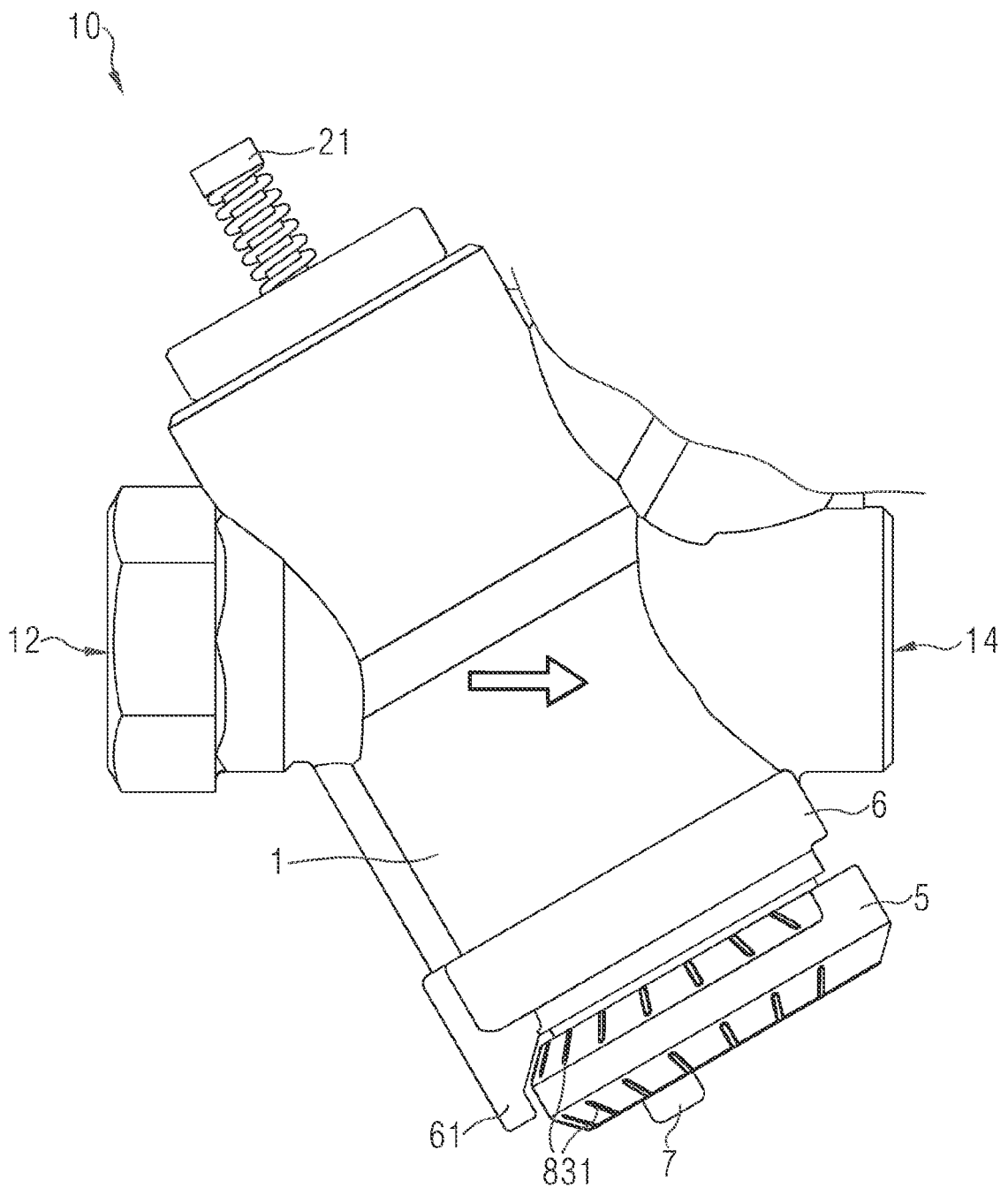
FIG. 1 is a three-dimensional schematic drawing of a control valve incorporating teachings of the present disclosure.

LIST OF LABELS USED IN THE DRAWINGS control valve 10
valve rod 2
valve body 1
fluid inlet 12
fluid outlet 14
control component 83
dial 831
slide groove 834
protrusion 8341
accommodating part 835
second engagement part 836
valve cap 6
pointer 61
tooth part 62
through-hole part 63
engagement part 64
locking member 7
operating part 71
penetrating part 72
anti-detachment part 73
locking part 731
adjusting rod 81
adjusting component 82

DETAILED DESCRIPTION

Some embodiments of the teachings herein include a control valve, comprising: a valve body, having a fluid inlet, a fluid outlet, and an inner cavity in fluid communication with the fluid inlet and the fluid outlet; a flow rate presetting assembly, comprising: an adjusting rod, having one end projecting from the bottom of the valve body and the other end extending into the inner cavity, the adjusting rod being rotatable around an axis of the adjusting rod; a control component, disposed at a bottom side of the valve body in such a way as to be rotatable around the axis, and connected in a shape-fitted manner to an end of the adjusting rod that projects from the valve body, in order to drive the adjusting rod to rotate; and an adjusting component, disposed in the inner cavity and fixedly connected to the adjusting rod, the adjusting component being rotatable between a first position and a second position under the driving action of the adjusting rod, in order to set a maximum degree of opening of the control valve; wherein an indicating part is provided on a surface of the control component that faces the valve body and/or on a surface of the control component that faces away from the valve body, and deviation of the indicating part relative to a reference position can indicate a maximum flow rate corresponding to a position of the adjusting component, the reference position being fixed relative to the valve body.

In some embodiments, the indicating part is provided on an outer surface of the valve body to indicate the value of the flow rate preset by the adjusting component, so an operator can adjust the flow rate presetting assembly by observing the indicating part, completing the operation without the need to dismantle the valve body.

In some embodiments, a radial dimension of the control component is greater than a radial dimension of the valve body, and the control component is a hand wheel. Then, the hand wheel can be easily operated by a user.

In some embodiments, the indicating part comprises a dial disposed at an edge position of the control component; the reference position is a pointer part, which is fixed relative to the valve body and extends to the outside of the indicating part of the control component. Then, the cooperative configuration of the indicating part and the reference position is simple, and easy to observe and read.

In some embodiments, the control valve further comprises: a regulating valve assembly, disposed in the inner cavity and able to adjust a degree of opening of the control valve under the driving action of a valve rod; wherein the adjusting rod is independent of the valve rod. Then, the degree of opening of the valve can be preset without affecting the valve rod.

In some embodiments, the control valve further comprises a locking member disposed at the control component, the locking member switching operably between a free position allowing rotation of the control component relative to the valve body and a locked position preventing rotation of the control component relative to the valve body. Then, the control component can be locked relative to the valve body, thereby increasing the stability of the valve during operation. The locking member can allow movement of the flow rate presetting assembly to realize flow rate presetting, and can also lock the flow rate presetting assembly.

In some embodiments, the control valve further comprises a removable valve cap disposed at the bottom of the valve body, the valve cap having a through-hole for the adjusting rod to project through, and the valve cap also having multiple tooth parts which are disposed on a surface facing the control component and arranged around the axis; the locking member has a locking part, configured to project toward the valve cap from the control component, wherein, when the locking member is at the locked position, the locking part interferes with the tooth part, thereby preventing rotation of the control component relative to the valve body; and when the locking member is at the free position, the interference between the locking part and the tooth part is released.

In some embodiments, the free position and the locked position of the locking member are distributed in a radial direction perpendicular to the axis; and the locking part is configured to be adapted to be clamped between two adjacent said tooth parts at the locked position. The locking relationship between the valve cap and the control component is stable and easy to implement.

In some embodiments, a slide groove that is a through-hole and extends in a radial direction is provided on the control component, the locking member being adapted to pass through the slide groove and slidable between the locked position and the position in the length direction of the slide groove; the locking member further comprises an operating part, which projects from the control component in a direction away from the valve body; wherein the locking member comprises an anti-detachment part located at a side of the slide groove that is close to the valve cap, and in an embodiment, the locking part is disposed on a surface of the anti-detachment part that faces the valve cap, and the slide groove has a transverse dimension smaller than that of the anti-detachment part. Then, the locking member has a simple structure and can be stably connected to the control component, while also being able to conveniently lock the control component.

In some embodiments, a protrusion located between the locked position and the free position is further provided on an inner wall of the slide groove, the protrusion being configured to be able to keep the locking member (7) at the current locked position or the current free position in the absence of external manipulation; and a part of the locking member that passes through the slide groove preferably has a rounded edge.

In some embodiments, the control valve further comprises an elastic member, which has one end fixedly connected to the locking member and the other end fixedly connected to the control component, the elastic member being arranged such that the locking member is subjected to a biasing force toward the locked position. Then, the switching of the locking member between the two positions is facilitated.

In some embodiments, the control component can be engaged with the valve cap, and has a rotatable position and an engaged position in the direction of the axis, wherein, in the engaged position, the control component is engaged with the valve cap such that the control component is fixed relative to the valve cap; and in the rotatable position, the engagement between the control component and the valve cap is released, so that the control component can rotate relative to the valve cap around the axis.

In some embodiments, a first engagement part is provided on an outer edge of the valve cap; a second engagement part is provided on an inner edge of the control component at a side facing the valve cap, the second engagement part being adapted to hook onto the first engagement part, and capable of reaching the engaged position and engaging tightly with the first engagement part under the action of gravity; wherein, when the control component is subjected to a force in the direction toward the valve cap and thus reaches the rotatable position, the engagement between the first engagement part and the second engagement part is released.

In some embodiments, the first engagement part is a component that is independent of the valve cap, and can be fitted around the bottom of the valve cap. Then, the valve cap can be engaged with the control component conveniently, and this engagement can be easily released.

In some embodiments, the indicating part is removably mounted on the control component. Then, replacement and maintenance of the indicating part are facilitated.

The control valves described herein may provide some or all of these features: 1. The indicating part is provided on the outer surface of the valve body to indicate the value of the flow rate preset by the adjusting component, so the operator can adjust the flow rate presetting assembly by observing the indicating part, completing the operation without the need to dismantle the valve body. 2. The locking member provided on the flow rate presetting assembly can allow movement of the flow rate presetting assembly to realize flow rate presetting, and can also lock the flow rate presetting assembly. 3. Control of the flow rate presetting assembly is simple and easy to perform, and the operation will not affect the valve rod because the adjusting rod is independent of the valve rod. 4. The control valve capable of realizing the above-mentioned functions has a simple structure and a low manufacturing cost.

To enable clearer understanding of the technical features, objects, and effects of the teachings herein, particular embodiments thereof are now explained with reference to the accompanying drawings. In some embodiments, there is a control valve capable of flow rate presetting. An example embodiment according to the present invention is described below with reference to FIGS. 1-6.

A control valve 10 in this embodiment comprises a valve body 1 and a flow rate presetting assembly 8. The valve body 1 has a fluid inlet 12 and a fluid outlet 14, and an inner cavity 16 in fluid communication with the fluid inlet 12 and fluid outlet 14. The arrow on the valve body 1 in FIGS. 1 and 2 indicates the flow direction of fluid in the inner cavity 16. The flow rate presetting assembly 8 provided on the control valve 10 can preset a maximum permitted flow rate of the control valve 10 in operation, i.e. define the maximum degree of opening of the valve. The control valve 10 may be a flow regulating valve which regulates flow rate, or an on/off valve with the sole function of opening and closing. Although the figures show a flow regulating valve as an example, those skilled in the art will understand that the control valve 10 may also be an on/off valve.

Figure 2:
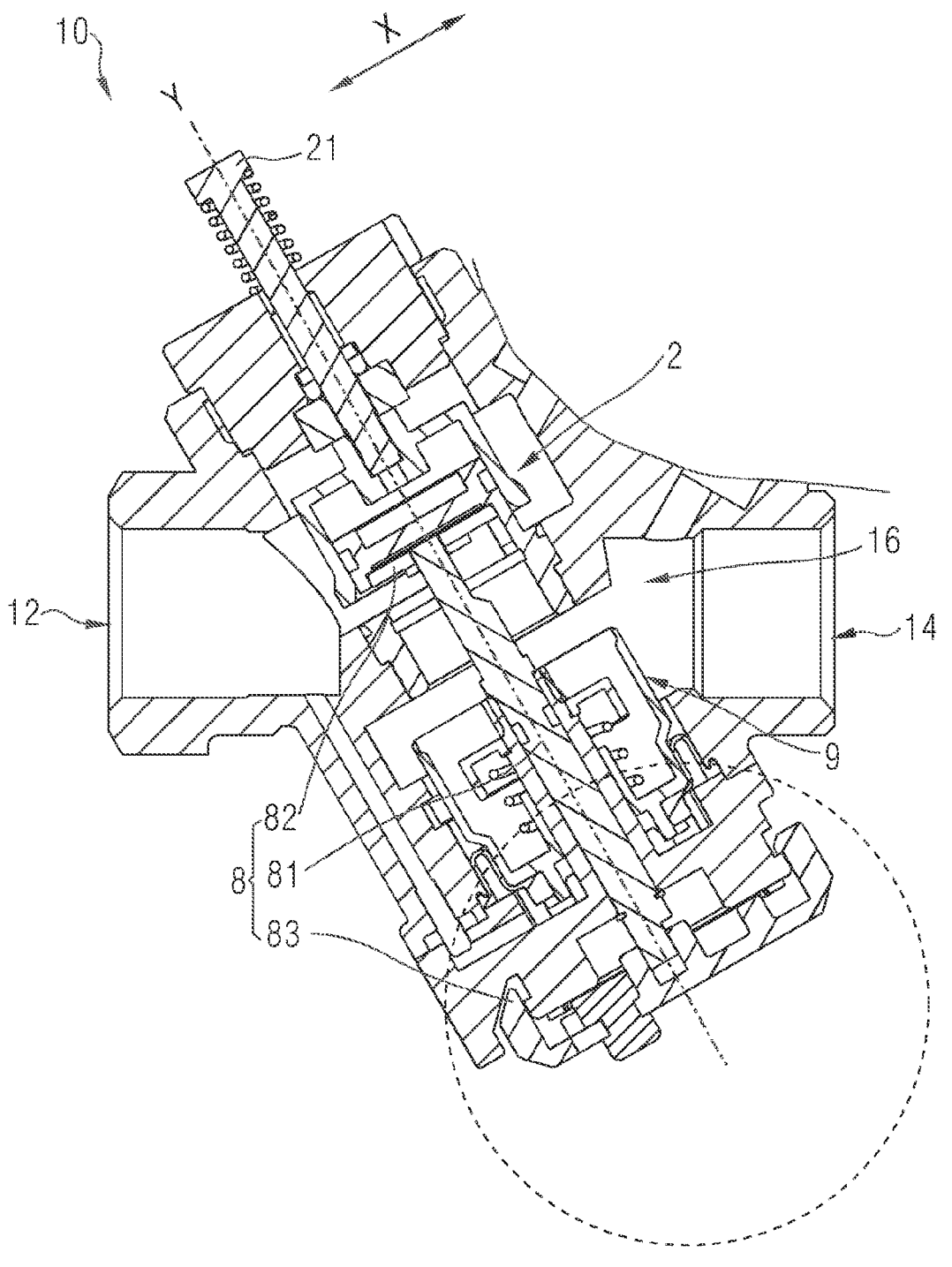
FIG. 2 is a sectional schematic drawing of the control valve in FIG. 1.

As shown in FIG. 2, the flow rate presetting assembly 8 comprises an adjusting rod 81, an adjusting component 82 and a control component 83. Specifically, one end of the adjusting rod 81 of the flow rate presetting assembly 8 projects from the bottom of the valve body 1, while the other end extends into the inner cavity 16, and the adjusting rod 81 is rotatable relative to the valve body around an axis Y of the adjusting rod. The control component 83 is disposed at a bottom side of the valve body 1 in such a way as to be rotatable around the axis Y, and is connected in a shape-fitted manner to the end 811 of the adjusting rod 81 that projects from the valve body 1, in order to drive the adjusting rod 81 to rotate. The adjusting component 82 is disposed in the valve body 1 and fixedly connected to the adjusting rod 81; the adjusting component 82 can rotate between a first position and a second position under the driving action of the adjusting rod 81, in order to set the maximum degree of opening of the control valve 10. For example, when the adjusting component 82 is located at the first position, the adjusting component 82 can block a fluid flow path to the maximum extent, at which time the control valve 10 has the minimum preset flow rate; when the adjusting component 82 is located at the second position, the adjusting component 82 blocks the fluid flow path to the minimum extent, at which time the control valve 10 has the maximum preset flow rate. The adjusting component 82 can rotate to any position between the first and second positions under the driving action of the adjusting rod 81, and the flow rate corresponding to this position is the preset flow rate that is set.

The control component 83 of the flow rate presetting assembly 8 is disposed at the bottom side of the valve body 1, and an indicating part 831 is provided on a surface of the control component that faces the valve body 1 and/or on a surface of the control component that faces away from the valve body. The deviation of the indicating part 831 relative to a reference position can indicate the maximum flow rate corresponding to the position of the adjusting component, wherein the reference position is fixed relative to the valve body.

Figure 3:
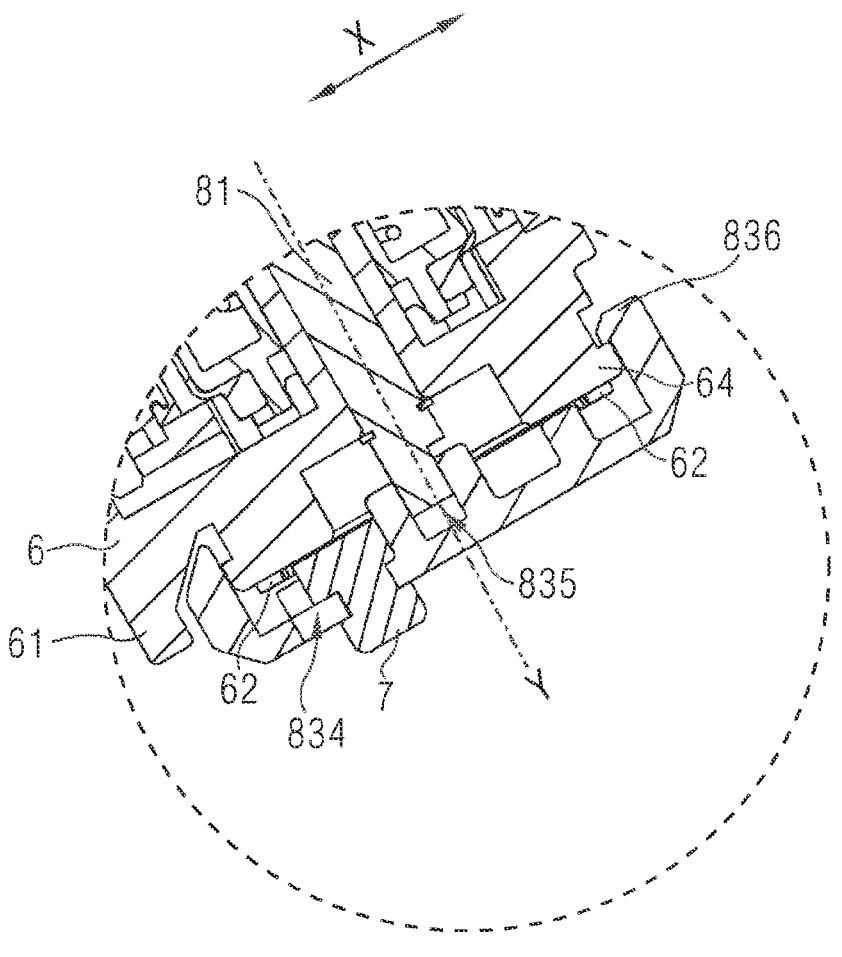
FIG. 3 is a partial enlarged schematic drawing of the part circled by the dotted line in FIG. 2.
Figure 4:
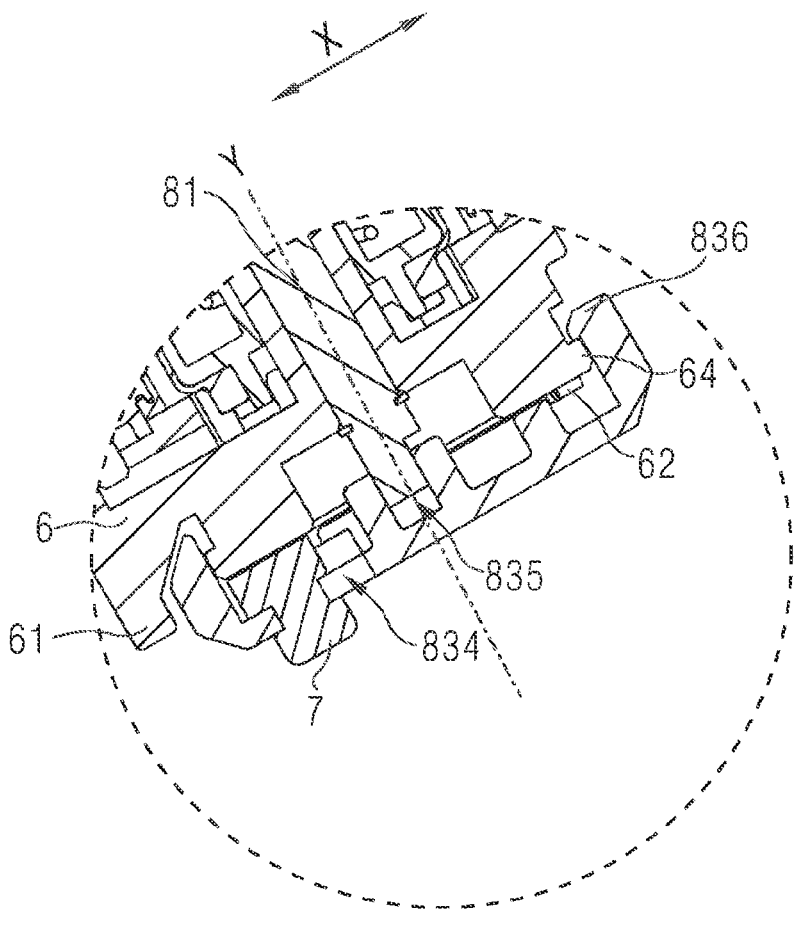
FIG. 4 is a schematic drawing of the locking member in FIG. 3, when located at the locked position.
Figure 5:
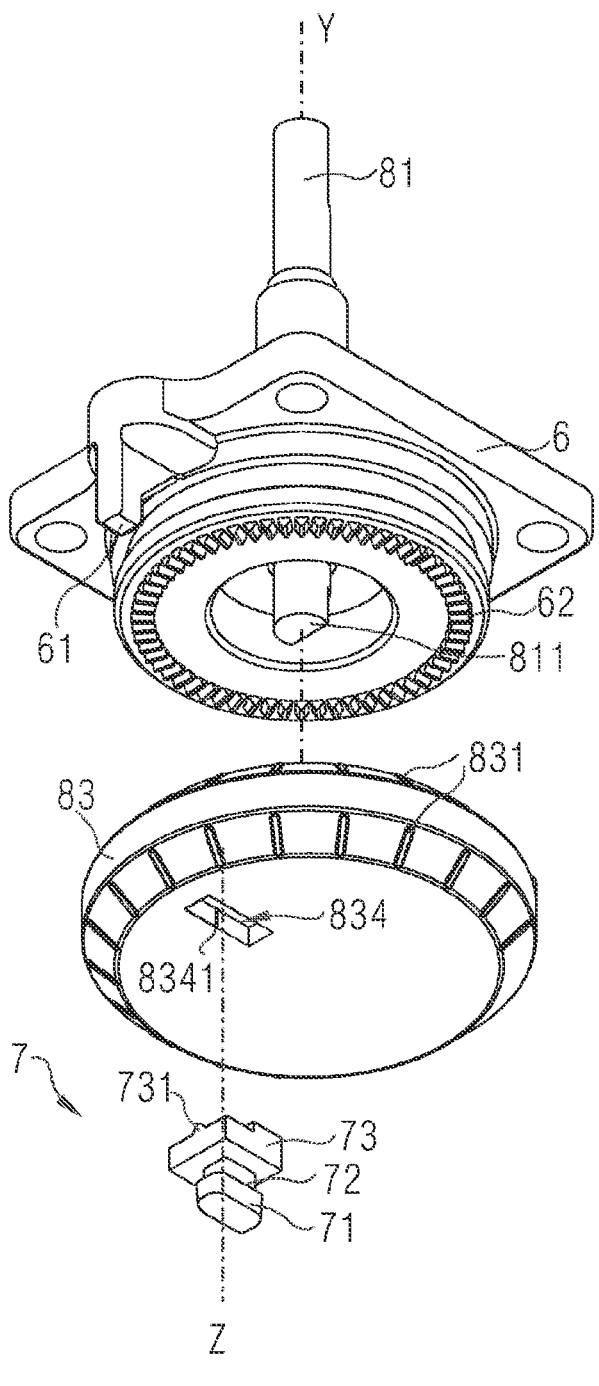
FIG. 5 is a drawing of the bottom structure of the control valve in FIG. 1, with the valve cap, the control component and the locking member in a separated state.

The adjusting component 82 and the control component 83 are both fixed relative to the adjusting rod 81 in the circumferential direction thereof; thus, the adjusting rod 81, the adjusting component 82 and the control component 83 can rotate together. When the control component 83 drives the adjusting component 82 to rotate to a predetermined position between the first position and second position, the control component 83 also rotates to a corresponding position, and the indicating part disposed on the control component 83 can indicate the preset flow rate at this time. Preferably, for example, the indicating part 831 is dials 831 formed on a bottom face and a top face of the control component 83, as shown in FIGS. 3-5. The reference position is a pointer 61 formed on a valve cap 6 (this is described in detail below). The pointer 61 points to a corresponding scale mark on the dial 831; by reading the value of the scale mark pointed to by the pointer, it is possible to ascertain the value of the preset flow rate at this time. Of course, in other embodiments which are not shown, various other configurations are possible for the indicating part and the reference position. For example, the pointer may be disposed on the valve body or on another component fixed relative to the valve body; or the indicating part may be a pointer disposed at the bottom and/or top of the control component, while the reference position is correspondingly a dial disposed on the valve body or on a component fixed relative to the valve body.

During operation, an operator can observe the cooperative relationship between the pointer and the dial and thereby turn the control component 83 to the required position, at which time the adjusting component 82 in the valve body 1 also reaches the predetermined position simultaneously.

That is to say, when adjusting the adjusting component 82, the operator can turn the adjusting component 82 to the required position directly by means of the scale marks and pointer disposed on an outer surface of the valve body, without needing to dismantle the valve body. Preferably, a radial dimension of the control component 83 is greater than a radial dimension of the valve body 1, and the control component 83 is more preferably a hand wheel. Thus, even if the operator is turning the control component while looking down from the top of the valve body 1, he or she will still be able to observe the scale mark position indicated by the indicating part, i.e. the desired preset flow rate.

In this embodiment, the control component 83 not only reaches the position corresponding to the preset flow rate by driving the adjusting component 82, but can also synchronously give an indication of the preset flow rate. Even better, the operator can also conveniently observe this indication of the preset flow rate. Such a structure can reduce the number of components, thus avoiding cumbersome configuration and operation of the flow rate presetting assembly 8.

In another aspect, in the embodiment shown in FIG. 2, the control valve 10 further comprises a regulating valve assembly 2, disposed in the inner cavity and able to adjust the degree of opening of the control valve 10 under the driving action of a valve rod 21. Furthermore, the adjusting rod 81 may be independent of the valve rod 21. In some embodiments, the valve rod 2 can be connected to an actuator (not shown), while the regulating valve assembly 2 further comprises a valve plug. Under the driving action of the actuator, the valve rod 21 can drive the valve plug to partially or completely block a fluid channel, i.e. the valve plug can change the circulation bore (also called the degree of opening of the valve) of the fluid channel under the driving action of the actuator. Considering the control valve 10 as a whole, the maximum degree of opening of the valve is controlled by the flow rate presetting assembly 8. In this embodiment, the adjusting rod 81 is independent of the valve rod 2, so the stroke of the valve rod 2 does not need to be restricted when performing flow rate presetting; thus, a flow rate presetting step is substantially independent of a flow rate control step during use.

In another aspect, in the embodiment shown in FIG. 2, the control valve 10 comprises a balancing regulator valve assembly 9 disposed in a lower part of the inner cavity; in response to pressure difference variation in the fluid at the fluid inlet 12 and in the inner cavity 16, the balancing regulator valve assembly can automatically balance this pressure difference so that it is fixed at a desired pressure difference value. A control valve having this balancing regulator valve assembly is also called a pressure independent regulating valve (PICV). It must first be explained that the "axial direction of the adjusting rod" mentioned herein means the Y direction as shown in the figures, and it will be understood that if the axes of the valve rod 2 and adjusting rod 81 are collinear, the axial direction of the valve rod 2 will also be the Y direction shown in FIGS. 1-6; and the rotation directions of the adjusting component 82, adjusting rod 81 and control component 83 as mentioned herein are all rotary motion around the Y direction.

In addition, the statement that a particular component is between two positions, as used herein, includes the situations in which the component is at the endpoint positions. For example, the statement "the adjusting component is between the first position and second position" includes the situations in which the adjusting component is located at the first position and the adjusting component is located at the second position.

In some embodiments, the control valve 10 further comprises the valve cap 6, the valve cap 6 being removably disposed at the bottom of the valve body 1, with a through-hole being provided in the valve cap 6, so that the adjusting rod 81 can pass through the through-hole and be fixedly joined to the control component 83. As shown by a through-hole part 63 of the valve cap 6 in FIGS. 5-7, a wall surface defining the through-hole extends axially, such that the through-hole has a large axial dimension; as a result of this configuration, the connection relationship between the adjusting rod 81 and the valve cap 6 is stable when the adjusting rod 81 is accommodated in the through-hole, and the adjusting rod 81 cannot easily deflect due to the constraining action of the through-hole. Because the control component 83 is fixed relative to the adjusting rod 81, while the valve cap 6 is fixed relative to the valve body 1 and the adjusting rod 81 is rotatable relative to the valve body 1, it will be understood that the control component 83 is rotatable relative to the valve cap 6.

In some embodiments, the control valve 10 further comprises a locking member 7 disposed at the control component 83, the locking member 7 being operable to move between a free position allowing rotation of the control component 83 relative to the valve cap 6 and a locked position preventing rotation of the control component 83 relative to the valve cap 6. Specifically, referring to FIGS. 4-6, in this embodiment, the free position and locked position are positions of the locking member 7 with respect to the control component 83. When the locking member 7 is at the locked position, the locking member 7 can engage with the valve cap 6 and thereby restrict rotation of the control component 83 relative to the valve cap 6; this state is shown in FIG. 3. When the locking member 7 is at the free position, the engagement between the locking member 7 and the valve cap 6 is released, thereby allowing the control component 83 to rotate relative to the valve cap 6; this state is shown in FIG. 4.

In some embodiments, as shown in FIG. 5, a tooth part 62 is provided on a bottom surface of the valve cap 6, and a locking part 731 is provided on a top surface of the locking member 7 (specifically, on a top surface of an anti-detachment part 73). When the locking member 7 is at the locked position, the locking part 731 interferes with the tooth part 62, thereby preventing rotation of the control component 83 relative to the valve body 1; when the locking member 7 is at the free position, the interference between the locking part 731 and the tooth part 62 is released. In some embodiments, there are multiple tooth parts 62, the multiple tooth parts 62 being arranged around the axis Y on the bottom surface of the valve cap 6, and each tooth part 62 extends radially on the bottom surface of the valve cap 6. The path of movement of the locking member 7 between the free position and the locked position is distributed in a radial direction perpendicular to the axis Y, and is substantially as shown by the X direction in FIGS. 3-4. In some embodiments, the locking part 731 can be adapted to be clamped between two adjacent tooth parts 62 at the locked position. Furthermore, the positions of the tooth parts 62 correspond to the predetermined positions of the adjusting component 82; when the adjusting component 82 rotates to a particular predetermined position, the locking member 7 is moved to the locked position, and the locking part 731 can mate with the corresponding tooth part 62, thereby fixing the control component 83 at this position.

Further, the number of tooth parts 62 corresponds to the number of preset flow rate steps; when the adjusting component 82 realizes each preset flow rate step, the locking part

731 can mate with the corresponding tooth part 62. For example, if the flow rate presetting assembly is able to preset the flow rate to twenty different values, i.e. the adjusting component 82 has twenty predetermined positions between the first position and second position, then the number of tooth parts 62 is also correspondingly twenty, and the positions of these twenty tooth parts 62 correspond to the twenty predetermined positions of the adjusting component 82; when the adjusting component 82 reaches a particular predetermined position, the locking member 7 can mate with one tooth part 62 after sliding to the locked position. It will be understood that if it is desired that the flow rate presetting assembly be able to realize stepless adjustment of preset flow rate, then the number of tooth parts 62 can be set large enough so that each time the preset flow rate changes a little, there can be a corresponding tooth part 62 to mate with the locking part 731 when the locking member 7 is slid to the locked position.

In this embodiment, the locking member 7 realizes switching between the locked position and the free position by sliding. A slide groove 834 that is a through-hole and extends radially is provided in the bottom of the control component 83 to facilitate the sliding of the locking member 7; the locking member 7 is adapted to pass through the slide groove 834, and is able to slide between the locked position and the position in the length direction of the slide groove 834.

Furthermore, referring to FIG. 5, it can be seen that the locking member 7, from top to bottom, sequentially comprises the anti-detachment part 73, a penetrating part 72 and an operating part 71, wherein the operating part 71 projects from the control component in a direction away from the valve body 1 and can be contacted by the operator, who can move the locking member 7 between the locked position and the free position by applying force to the operating part 71; the anti-detachment part 73 is located at a side of the slide groove 834 that is close to the valve body 1, and has a transverse dimension (i.e. a dimension parallel to a bottom wall of the control component 8 and perpendicular to the sliding direction of the locking member 7) larger than that of the slide groove 834, such a configuration making it possible to avoid detachment of the locking member 7 from the slide groove 834, and the locking part 731 is disposed on the anti-detachment part 73; and the penetrating part 72 passes through the slide groove 834, the dimensions of the penetrating part 72 being adapted to the dimensions of the slide groove 834. The assembly relationship in which the locking member 7 is fitted to the control component 83 is shown in FIG. 5; as shown in this figure, the locking member 7 can substantially be fitted to the control component 83 upward in the Z direction.

To enable the locking member 7 to be located stably at the free position or locking position, various structures may be disposed on the control component 83 and/or the locking member 7. For example, the locking member 7 and the control component 83 may be made of a plastic material, while the slide groove 834 may be provided with a protrusion 8341 between the locking position and the free position (as shown in FIG. 5). More preferably, the protrusion 8341 has an arc-shaped surface, and a junction between sidewalls of the penetrating part 72 of the locking member 7 is formed as a rounded corner (as shown in FIG. 5); without action by an external force, the protrusion 8341 can block the penetrating part 72 and thereby restrict the locking member 7 to the locked position or free position, but when an external force is applied to the locking member 7, the rounded corner can go over the protrusion 8341 because the plastic can deform slightly, so that the locking member 7 switches position.

As another example, an elastic member may be mounted on the locking member 7 and/or the control component 83; the elastic member has one end fixedly connected to the locking member 7 and the other end fixedly connected to the control component 83, and is arranged such that the locking member is subjected to a biasing force toward the locked position. For example, when the locking member 7 is located at the locked position, the elastic member may be in a natural state or have a slight biasing force, and when the locking member 7 slides from the locked position to the free position, the elastic member is biased and has a biasing force which biases the locking member 7 to return to the locked position from the free position; when the control component 83 has been turned, the external force disappears, and the locking member 7 can spring back naturally to the locked position under the biasing force of the elastic member.

The control component 83 can be engaged with the valve cap 6, and has a rotatable position and an engaged position in the Y direction; in the engaged position, the control component 83 is engaged with the valve cap 6 such that the control component 83 is fixed relative to the valve cap 6; in the rotatable position, the engagement between the control component 83 and the valve cap 6 is released, so that the control component 83 can rotate relative to the valve cap 6 around the axis Y.

To achieve this object, referring to FIGS. 3-4, a bottom edge of a body of the valve cap 6 is provided with a first engagement part 64 which protrudes outward in a radial direction thereof, while an inner edge of the control component 83 is provided with a second engagement part 836, which is adapted to hook onto the first engagement part 64, and can reach the engaged position and engage tightly with the first engagement part 64 under the action of gravity. When the control component 83 is subjected to a force in the direction toward the valve cap 6 and thus reaches the rotatable position, the engagement between the first engagement part 64 and the second engagement part 836 is released; because the first engagement part 64 and the second engagement part 836 only interact in the axial direction and have no force of radial interaction, the mating between the first engagement part 64 and the second engagement part 836 can prevent movement of the control component 83 relative to the valve cap 6 in the axial direction, but will not prevent rotation of the control component 83 relative to the valve cap 6 around the axis, i.e. retains only the degree of freedom of rotation of the control component 83.

It will be understood that because the first engagement part 64 and the second engagement part 836 are in contact with each other, when the control component 83 has a tendency to rotate relative to the valve cap 6, friction will arise between the first engagement part 64 and the second engagement part 836, thus preventing rotation of the control component 83. To avoid this situation, when the control component 83 needs to be turned, it is necessary to apply an upward action force to the control component 83 so that contact between the first engagement part 64 and the second engagement part 836 is broken, and then turn the control component 83.

In some embodiments, the first engagement part may be a component that is independent of the valve cap, and can be fitted around the bottom of the valve cap. In some embodiments, the indicating part may be removably mounted on the control component, instead of being formed on the control component directly. Some embodiments may also have a greater number of preferred settings.

For example, the adjusting component 82 enables multiple preset flow rate steps; for example, between the preset flow rate realized by the first position and the preset flow rate realized by the second position, multiple preset flow rate steps can be set with 5% or 2% as the increment of each step. Alternatively, the gap between tooth parts may be set small enough so that the flow rate presetting assembly is configured to enable nearly stepless variation of preset flow rate. At the same time, the scale marks of the dial 831 may correspond to the number of preset flow rate steps, so that when the adjusting component 82 realizes each preset flow rate step, the pointer 61 can point to a corresponding scale mark of the dial 831.

Figure 6:
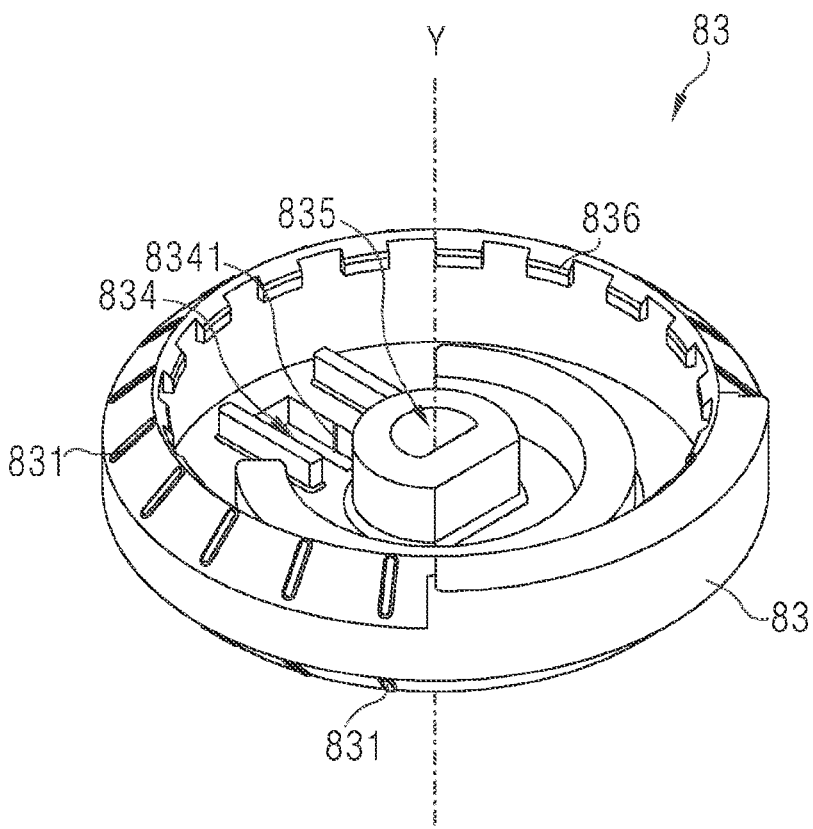
FIG. 6 is a three-dimensional schematic drawing of the control component in FIG. 5.

Various configurations are possible for the connection relationships between components. For example, with regard to the connection between the adjusting rod 81 and the control component 83, an accommodating part 583 with a top opening may be disposed on the control component 83 for the purpose of receiving the bottom of the adjusting rod 81; the particular structure of the accommodating part 583 is shown in FIG. 6. To avoid relative rotation between the adjusting rod 81 and the control component 83, the bottom of the adjusting rod 81 may be configured to have a non-circular radial cross section; the bottom of the adjusting rod 81 may be a non-circular columnar body, for example a bottom surface of the adjusting rod 81 may be formed as a D shape. The shape of the accommodating part 583 corresponds to the shape of the bottom of the adjusting rod 81; when viewed at the viewing angle of the top view shown in FIG. 6, it will be observed that the accommodating part 583 is also correspondingly a D shape. Thus, when the adjusting rod 81 is accommodated in the accommodating part 583, the adjusting rod 81 cannot rotate in the accommodating part 583 because neither the adjusting rod 81 nor the accommodating part 583 is cylindrical, so the control component 83 is fixed relative to the valve cap 6 in the rotation direction. Furthermore, the control component 83 and the adjusting rod 81 are each axially constrained, and are therefore fixed relative to each other in the axial direction too.

When the operator needs to adjust the preset flow rate of the control valve, he or she first of all slides the locking member 7 from the locked position to the free position by manipulating the operating part 71 of the locking member 7, and then pushes the control component 83 upward slightly in the axial direction, so that it breaks contact with the valve cap 6 and is thus easy to turn. Next, the operator turns the control component 83, while reading the scale marks on the dial 831 pointed to by the pointer 61 to stop the control component 83 at the required position, at which time the adjusting component 82 in the valve body 1 has also correspondingly rotated to the predetermined position to realize the required preset flow rate. The locking member 7 is then slid back to the locked position, to lock the flow rate presetting assembly at this position.

In some embodiments, the control valve has the following advantages: 1. The pointer and scale marks are provided on the outer surface of the valve body to indicate the value of the flow rate preset by the adjusting component, so the operator can adjust the flow rate presetting assembly by observing the cooperative relationship between the pointer and the scale marks, completing the operation without the need to dismantle the valve body. 2. The locking member provided on the flow rate presetting assembly can allow movement of the flow rate presetting assembly to realize flow rate presetting, and can also lock the flow rate presetting assembly. 3. Control of the flow rate presetting assembly is simple and easy to perform, and the operation will not restrict the stroke of the valve rod because the adjusting rod is independent of the valve rod 4. The control valve capable of realizing the abovementioned functions has a simple structure and a low manufacturing cost.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments understandable to those skilled in the art.

The embodiments above are merely particular schematic embodiments of the teachings of the present disclosure, which are not intended to limit the scope thereof. All changes, amendments, and combinations made by any person skilled in the art without departing from the concept and principles of the present disclosure shall fall within the scope of protection thereof.

What is claimed is:

1. A control valve comprising:
a valve body having a fluid inlet, a fluid outlet, and an inner cavity between the fluid inlet and the fluid outlet;
a flow rate presetting assembly including:
an adjusting rod having a first end projecting from the valve body and a second end extending into the inner cavity, the adjusting rod rotating around an axis;
a control component disposed at a bottom side of the valve body and rotating around the axis, and connected in a shape-fitted manner to the first end of the adjusting rod to rotate the adjusting rod; and
an adjusting component disposed in the inner cavity and fixedly connected to the adjusting rod, the adjusting component rotating between a first position and a second position under the driving action of the adjusting rod to set a maximum degree of opening of the control valve;
an indicator on a surface of the control component, wherein a deviation of the indicator relative to a reference position indicates a maximum flow rate corresponding to a position of the adjusting component, the reference position fixed relative to the valve body; and
a locking member disposed at the control component, the locking member switching between a free position allowing rotation of the control component relative to the valve body and a locked position preventing rotation of the control component relative to the valve body
wherein the free position and the locked position of the locking member are distributed in a radial direction perpendicular to the axis.

2. The control valve as claimed in claim 1, wherein a radial extent of the control component is greater than a radial extent of the valve body.

3. The control valve as claimed in claim 1, wherein:
the indicator comprises a dial disposed at an edge position of the control component; and
the reference position comprises a pointer part fixed relative to the valve body and extending outside of the indicator of the control component.

4. The control valve as claimed in claim 1, further comprising a regulating valve assembly disposed in the inner cavity and able to adjust a degree of opening of the control valve under the driving action of a valve rod;

wherein the adjusting rod is independent of the valve rod.

5. The control valve as claimed in claim 1, further comprising a removable valve cap disposed at the bottom of the valve body, the valve cap having a through-hole for the adjusting rod to project through, and the valve cap also having multiple tooth parts disposed on a surface facing the control component and arranged around the axis;
wherein the locking member includes a locking part projecting toward the valve cap from the control component;
wherein, when the locking member is at the locked position, the locking part interferes with the tooth part, thereby preventing rotation of the control component relative to the valve body; and
when the locking member is at the free position, the interference between the locking part and the tooth part is released.

6. The control valve as claimed in claim 1, further comprising:
a slide groove that is a through-hole and extends in a radial direction;
wherein the locking member is adapted to pass through the slide groove and slidable between the locked position and the position in the length direction of the slide groove;
the locking member further comprises an operating part projecting from the control component away from the valve body;
wherein the locking member comprises an anti-detachment part located at a side of the slide groove that is close to the valve cap, the locking part is disposed on a surface of the anti-detachment part that faces the valve cap, and the slide groove has a transverse extent smaller than that of the anti-detachment part.

7. The control valve as claimed in claim 6, further comprising a protrusion located between the locked position and the free position on an inner wall of the slide groove, the protrusion configured to be able to keep the locking member at the current locked position or the current free position in the absence of external manipulation; and
a part of the locking member that passes through the slide groove has a rounded edge.

8. The control valve as claimed in claim 5, wherein the control component can be engaged with the valve cap and has a rotatable position and an engaged position in the direction of the axis;
wherein, in the engaged position, the control component is engaged with the valve cap such that the control component is fixed relative to the valve cap; and
in the rotatable position, the engagement between the control component and the valve cap is released, so that the control component can rotate relative to the valve cap around the axis.

9. The control valve as claimed in claim 8, further comprising:
a first engagement part on an outer edge of the valve cap; and
a second engagement part on an inner edge of the control component at a side facing the valve cap, the second engagement part adapted to hook onto the first engagement part and capable of reaching the engaged position and engaging tightly with the first engagement part under the action of gravity;
wherein, when the control component is subjected to a force in the direction toward the valve cap and thus reaches the rotatable position, the engagement between the first engagement part and the second engagement part is released.

10. The control valve as claimed in claim 9, wherein the first engagement part is a component independent of the valve cap and can be fitted around the bottom of the valve cap.

\* \* \* \* \*